(12) United States Patent
Hammell et al.

(10) Patent No.: US 7,434,726 B2
(45) Date of Patent: Oct. 14, 2008

(54) METHOD AND SYSTEM FOR POSTDATING OF FINANCIAL TRANSACTIONS

(75) Inventors: Bradley R. Hammell, Farifield, CT (US); Matthew J. Campagna, Ridgefield, CT (US); Robert A. Cordery, Danbury, CT (US); Bertrand Haas, New Haven, CT (US); Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/434,331

(22) Filed: May 15, 2006

(65) Prior Publication Data

US 2007/0262135 A1 Nov. 15, 2007

(51) Int. Cl.
*G06F 19/00* (2006.01)

(52) U.S. Cl. ........................................ 235/379; 705/39

(58) Field of Classification Search ................. 235/379, 235/380; 902/1, 2, 39, 40; 705/1–45, 50–80
See application file for complete search history.

(56) References Cited

U.S. PATENT DOCUMENTS

| | | | | |
|---|---|---|---|---|
| 5,326,959 A | * | 7/1994 | Perazza | 235/379 |
| 5,883,810 A | * | 3/1999 | Franklin et al. | 700/232 |
| 6,021,399 A | * | 2/2000 | Demers et al. | 705/39 |
| 6,041,315 A | * | 3/2000 | Pollin | 705/45 |
| 6,317,745 B1 | * | 11/2001 | Thomas et al. | 707/100 |
| 6,728,376 B1 | * | 4/2004 | Dean et al. | 380/54 |
| 7,003,117 B2 | | 2/2006 | Kacker et al. | |
| 2003/0081785 A1 | | 5/2003 | Boneh et al. | |
| 2004/0001087 A1 | * | 1/2004 | Warmus et al. | 345/745 |
| 2006/0015463 A1 | * | 1/2006 | Gupta et al. | 705/52 |
| 2006/0020550 A1 | * | 1/2006 | Fields et al. | 705/51 |

OTHER PUBLICATIONS

Ethics Interpretation EI-2002-001, Issued Jun. 21, 2002, p. 1-4, Oklahoma Ethics Commission.*
Boneh, D. and Franklin, M.; "Identity-Based Encryption from the Weil Pairing," SIAM Journal of Computing, vol. 32, No. 3, pp. 586-615, 2003.

* cited by examiner

*Primary Examiner*—Daniel A Hess
(74) *Attorney, Agent, or Firm*—Brian A. Lemm; Angelo N. Chaclas

(57) ABSTRACT

Methods and systems that prevent completion of postdated financial transactions until the specified future date is provided. A portion of the information necessary to complete a financial transaction is encrypted utilizing an identity-based encryption (IBE) scheme. The encryption key used to encrypt the information is associated with the date on which the transaction is authorized to be completed. The encrypted information is provided to the payee. The issuing bank provides a daily decryption key that allows decryption of information encrypted using the key associated with the corresponding date. Thus, only when the maturity date of the transaction has arrived will the payee or depositing bank be able to obtain the decryption key that will decrypt the encrypted information necessary to complete the transaction. Since the encrypted information can not be decrypted until the date associated with the encryption key, the financial transaction can not be completed until such date.

9 Claims, 3 Drawing Sheets

METHOD AND SYSTEM FOR POSTDATING OF FINANCIAL TRANSACTIONS

FIELD OF THE INVENTION

The invention disclosed herein relates generally to processing financial transactions, and more particularly to methods and systems for postdating financial transactions that prevent completion of the financial transactions until the specified future date.

BACKGROUND OF THE INVENTION

The process of making a payment utilizing a checking account maintained at a financial institution, such as, for example, a bank, is well known and used throughout the world. In general, the payer maintains an account at an issuing institution against which funds can be drawn. The payer drafts a check, which indicates, for example, the issuing institution at which the account is maintained, the account number for the payer, the name and address of the payer, the name of the payee, the amount of money to be paid to the payee, the date of authorization and, typically, the payer's authentication information (e.g., signature). The payee presents the check to a depository institution. The depository institution presents the check to a check clearing system (such as the Federal Reserve in the United States), which then handles the movement of the check to the issuing institution and the corresponding movement of funds from the issuing institution to the depository institution. With recent advances in technology, the check clearing process can also be performed electronically.

Generally, the issuing of a check by the payer indicates to the payee that the funds for the check are available at that time. In some situations, however, the payer desires to provide a check to the payee dated some date in the future, also known as postdating, with instructions to the payee that the check should not be presented until such future date. Such situations could include, for example, payments being made based on the expectation of a deposit (such as a paycheck or the like) into the account against which the check is drawn, or payments being made in advance of the due date for the convenience of the payer and/or payee. While many people are under the impression that such postdated checks will not be honored by financial institutions until the date written on the check, this is not the case. Postdating a check may not prevent the payee from presenting the check for payment before the date written on the check, and also may not prevent financial institutions from honoring the check when presented. This is because the date that is written on a check has no function in the check clearing process.

Similarly, in the event that payments are being made electronically, using for example, the Internet, the payer may desire to complete instructions for payment (e.g., providing the bank name, routing number, account number, amount, etc.) at some date earlier than the payer desires the payment to be actually debited from his account. Although in many cases the payer can indicate the date of payment, there is no guarantee that the payee will honor such date, and a request for payment may be presented any time after the payer has provided the information to make payment. Thus, regardless of whether payment is being made by physical check or electronically, situations can arise in which the payer's account is overdrawn and checks or payment authorizations will not be honored because of insufficient funds in the payer's account.

Thus, there exists a need for methods and systems that prevent completion of postdated financial transactions until the specified future date.

SUMMARY OF THE INVENTION

The present invention alleviates the problems associated with the prior art and provides methods and systems that prevent completion of postdated financial transactions until the specified future date. According to embodiments of the invention, a portion of the information necessary to complete a financial transaction, such as, for example, an authorization number, account number or amount, is encrypted utilizing an identity-based encryption (IBE) scheme. Since the information associated with a transaction may not provide sufficient randomness to prevent a payee from guessing the correct information (including the authorization number) and testing the guess with the public encryption key, a random pad, having sufficient length to prevent verifying a guess of the transaction information, can optionally be included in the transaction information. The encryption key used is computed using information associated with the transaction that preferably includes, for example, public information related to the issuing bank, e.g., bank identification, routing number, etc., that is optionally combined with the date on which the transaction is authorized to be completed. The encrypted information is provided to the payee, along with any other items of information required to complete the transaction. The payee can then hold the information until the maturity date or immediately present the information, including the encrypted authorization number, to a depositing bank for payment, and the depositing bank can hold the information until the maturity date. On the date that a transaction is authorized to be completed, the issuing bank provides a decryption key that allows decryption of information encrypted for the corresponding date. Thus, on the maturity date of the transaction, the payee or depositing bank can obtain the decryption key that will decrypt the encrypted information necessary to complete the transaction. With all of the necessary information to complete the transaction, the payee or depositing bank can then complete the transaction. Since the encrypted information can not be decrypted until the date on which the transaction was authorized, e.g., the date associated with the encryption key and corresponding decryption key, the financial transaction can not be completed until such date has arrived.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
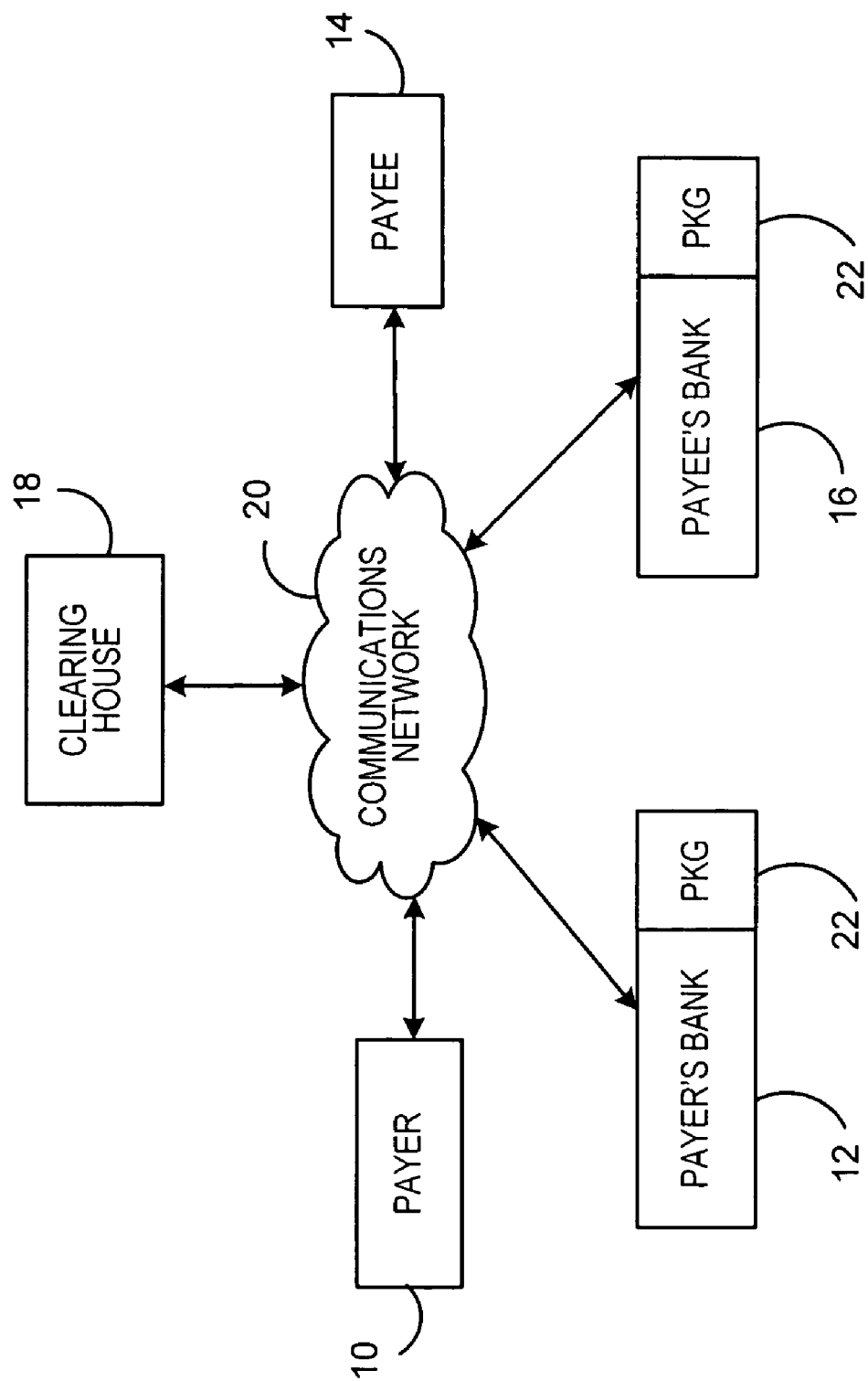
FIG. 1 illustrates in block diagram form a system for processing financial transactions according to embodiments of the present invention.

In describing the present invention, reference is made to the drawings, where there is seen in FIG. 1 in block diagram form a system for processing financial transactions according to an embodiment of the present invention. The system includes a payer 10 that maintains a monetary account against which funds can be drawn at a financial institution, indicated as the payer's bank 12. The payer 10 can be an individual, business, corporation or the like. The payer 10 can make payments to a payee 14, which can also be, for example, an individual, business, corporation or the like. The payee 14 may also maintain a monetary account at a financial institution, indicated as the payees' bank 16. The payer's bank 12 and the payee's bank 16 can utilize a clearing house 18 to clear checks presented for payment in known manners. A communications network 20, which can be, for example, an electronic communication network, physical communication network, or other type of communication network can be utilized to process communications between each of the parties illustrated in FIG. 1, such as, for example, electronic authorizations or the like, in known manners. It should be understood that the present invention can be utilized with any type of payment system and clearing process for such payments. Each of the banks 12, 16 preferably includes a private key generator (PKG) 22. Alternatively, a single PKG 22 can be operated by a third party for utilization by both banks 12, 16. In this scenario, PKG 22 is preferably a trusted party, such as, for example, a reliable and reputable commercial entity or governmental entity.

The present invention utilizes an identity-based encryption scheme to prevent the completion of postdated financial transactions until the specified future date. In such an identity-based encryption scheme, a public-key cryptosystem is utilized to encrypt/decrypt some portion or all of the information associated with a financial transaction that is required to complete the transaction. Public-key cryptosystems allow two parties to exchange private and authenticated messages without requiring that they first have a secure communication channel for sharing private keys. In a public-key cryptosystem, each party has a unique pair of keys: a private key that is a secret and a public key that is widely known and can be obtained and used by any party without restrictions. This pair of keys has two important properties: (1) the private key cannot be deduced from knowledge of the public key and the message, and (2) the two keys are complementary, i.e., a message encrypted with one key of the pair can be decrypted only with the complementary key of the pair. In one particular type of public-key cryptosystem, a party's public key can be computed from a standardized public identifier associated with the party, such as, for example, the party's name, unique identification, e-mail address, etc. Because the public key is a publicly known function of only the party's pre-existing public identifier rather than a key produced from a random seed, this kind of public-key cryptosystem is called an identity-based encryption (IBE) scheme. One implementation of an IBE scheme is described in detail in U.S. Published Patent Application No. 2003/0081785 A1, the disclosure of which is incorporated herein by reference.

The preferred IBE scheme utilized to implement the present invention is described in detail in the aforementioned U.S. Published Patent Application No. 2003/0081785 A1, although other similar IBE schemes may also be used. The preferred IBE scheme utilizes public keys that each consists of an arbitrary string derived from one or more identity related parameters for the transaction along with the date on which the financial transaction is authorized to be completed.

Figure 2:
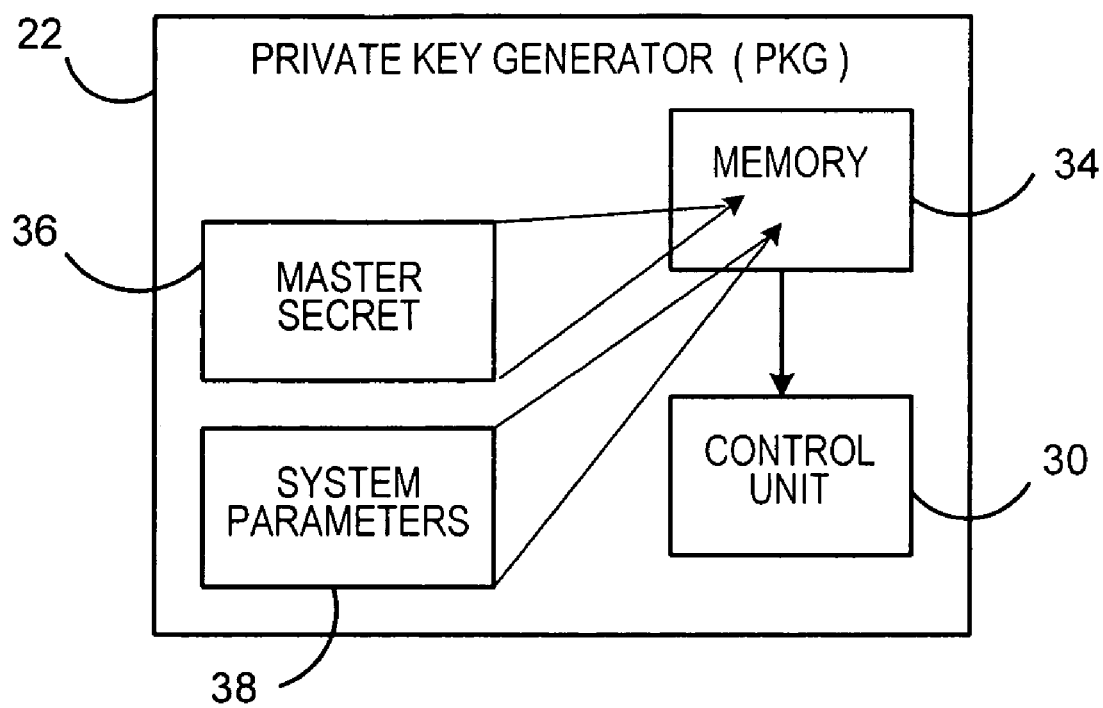
FIG. 2 illustrates in block diagram form a private key generator that is used in processing financial transactions according to embodiments of the present invention.

The processing of financial transactions according to embodiments of the present invention will be described with respect to FIGS. 2-4. Referring to FIG. 2, there is illustrated in block diagram form a PKG 22, which as noted above with respect to FIG. 1, may either be included with each bank 12, 16 or independent thereof. The PKG 22 is used to generate and manage the cryptographic keys utilized in the present invention. PKG 22 has knowledge of a secret master key and utilizes a control unit 30, such as an information processor or the like, to generate a corresponding private key for each given public key as described below. The PKG 22 performs a setup procedure to generate a master secret parameter 36 and system parameters 38 associated with the specific encryption/decryption algorithm utilized to encrypt/decrypt information. The master secret parameter 36 includes, for example, some integer known only to the PKG 22. The system parameters 38 include, for example, elliptic curve parameters associated with specific points on the curve used in the encryption algorithm, and are made publicly available for use as described below. The master secret parameter 36 and system parameters 38 can be stored in the securely protected memory 34. The master secret parameter 36 and system parameters 38 are used by the control unit 30 of PKG 22 to generate corresponding decryption keys as described below. The system parameters 38 are also used in encrypting at least a portion of information required to complete a financial transaction as described below.

Figure 3:
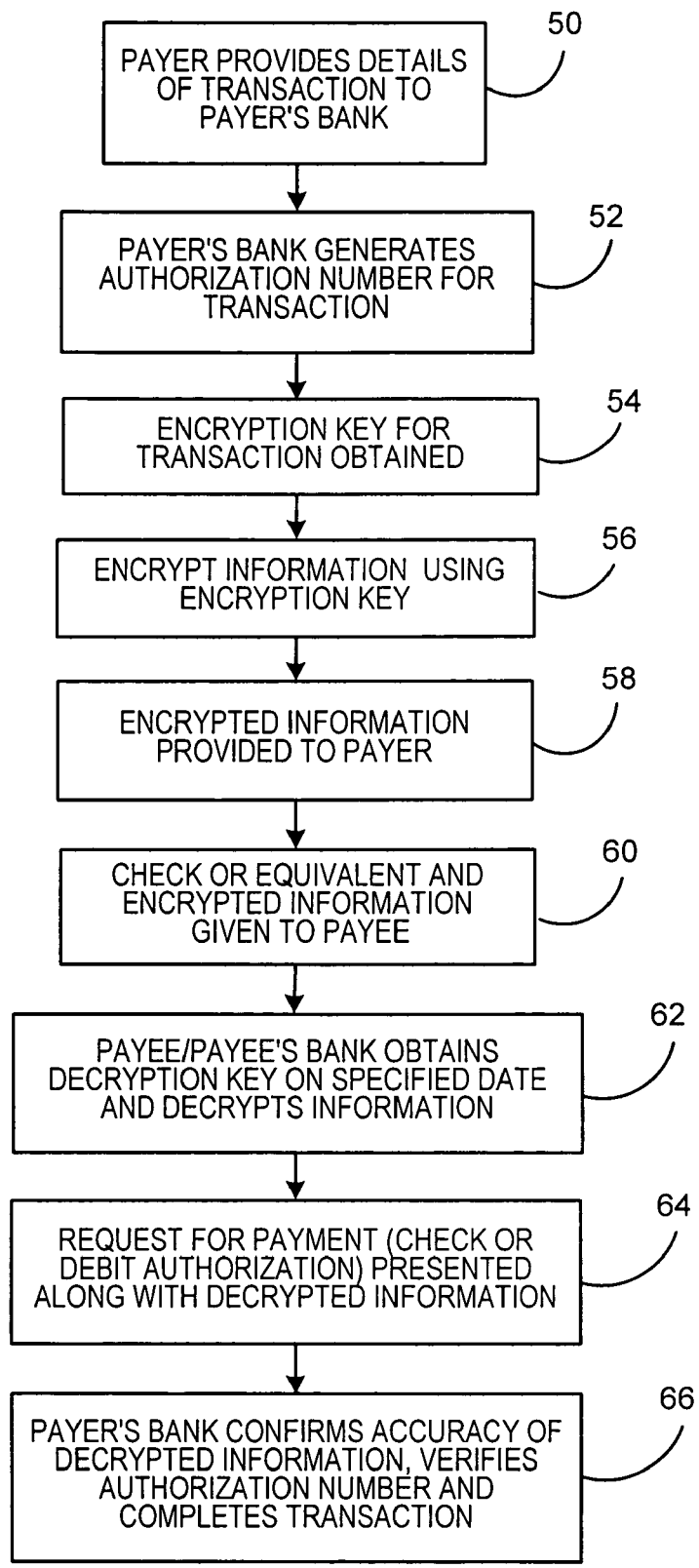
FIG. 3 illustrates in flow diagram form processing of a financial transaction according to an embodiment of the present invention.

Referring now to FIG. 3, there is illustrated in flow diagram form the processing of a financial transaction according to an embodiment of the present invention. Suppose, for example, that the payer 10 wishes to make a payment to the payee 14 using a check or an authorized electronic debit drawn on an account maintained by the payer 10 in the payer's bank 12 (also known as the issuing bank). The payer 10 desires that the transaction will not be completed until some future date, i.e., the payer 10 desires to postdate the check or authorized debit to some future date. In step 50, the payer 10 provides details concerning the financial transaction to the payer's bank 12, including the date on which the transaction is authorized to be completed (also referred to as the maturity date), and requests an authorization number from the payer's bank 12 for the transaction. The details concerning the financial transaction can also include, for example, the name of the payee 14, the amount of payment, check number, etc. In step 52 the payer's bank 12 generates an authorization number for the transaction, and stores the authorization number. Preferably, the authorization numbers are randomly generated using, for example, an information processing system or the like. In order for the payer's bank 12 to complete the transaction and release the funds associated with the financial transaction, the information necessary to complete the transaction and the authorization number must be received from the party requesting payment. In step 54, the payer's bank 12, or the PKG 22 of the payer's bank 12 (or of a third party) computes an encryption key that will be used to encrypt the authorization number for the transaction. The encryption key, also referred to herein as the public key, can be computed by the control unit 30 using information associated with the transaction, and is associated with some future date. The information associated with the transaction preferably includes identity-based information for the payer's bank 12, e.g., bank identification, routing number, etc., and can also include date specified by the payer 10 on which the transaction is authorized to be completed. Thus, the encryption key used for all transactions (regardless of the account holder) to be completed by a specific bank on a specific day will be the same. Decryption of the encrypted information requires the use of a corresponding decryption key, also referred to herein as the private key. Since the date of authorization is preferably used as an input to generate the encryption/decryption keys, the public key, and hence the corresponding private key, will be different for each date. Additionally, since information specific to the bank issuing the authorization number is used as an input to generate the encryption/decryption keys, the keys used by different financial institutions will also be different. The public and private keys may be generated in advance for each date and stored in a database or the like, but as described below, the private keys are not made available before the date used as the input. This can be done under control of a secure trusted system that makes use of a secure real time clock, which may be duplicated for redundancy purposes.

In step 56, the key obtained in step 54 is used to encrypt the authorization number for the financial transaction. The key can also be used to encrypt other information associated with the transaction that will be required by the payer's bank 12 to complete the transaction, such as, for example, the amount, the payer's 10 account number, etc. The encryption is preferably performed using a known and shared public key encryption algorithm that can be part of an application being run by the control unit 30. The encryption algorithm utilizes the key obtained in step 54 along with the system parameters 38 generated by the PKG 22 to encrypt the authorization number. The authorization number and other information associated with the transaction may not provide sufficient randomness to prevent a party from guessing the correct information, especially if the authorization number is not very large. The guess could then be tested using the known encryption key until the correct authorization number has been determined. To help prevent this from occurring, a random pad, long enough to prevent verifying a guess of the authorization number, can optionally be included in the information that is encrypted. Optionally, the encrypted information could be signed with a digital signature by either the payer's bank 12 or the payer 10, thereby allowing verification that the encrypted authorization number is actually received from the payer's bank 12 or the payer 10 and the integrity of the received information can be assured. In step 58, the encrypted authorization number, and other information if also encrypted, is provided to the payer 10. Alternatively, the encrypted authorization number can simply be provided to the payee 14 by the payer 10, or to the payee 14 or the payee's bank 16 directly from the payer's bank 12.

In step 60, the payer 10 can provide the physical check, or its electronic equivalent, and encrypted information to the payee 14. In the case of a written check, the encrypted authorization number is preferably included by the payer 10 on the check. The payee 14, upon receiving the check, can present the check to the payee's bank 16 (also known as the depositing bank) for payment, along with the encrypted authorization number if not already known by the payee's bank 16. In the case of a payment being authorized electronically by the payer 10 using the network 20, the payer 10 can provide the payee 14 with information typically required by the payee 14 to obtain payment from the payer's bank 12, e.g., bank number, routing number, account number, amount, etc., which may or may not be encrypted, and the encrypted authorization number via the network 20. As noted above, the payer's bank 12 will not complete that transaction and allow the transfer of funds until it has received the decrypted authorization number associated with the transaction. In other words, any clearing process by necessity will include obtaining and processing of authorized information. Thus, the payee 14 and/or the payee's bank 16 must wait until the decryption key that will decrypt the encrypted authorization code is available before presenting the check for payment or attempting to debit the account of the payer 10 electronically. The corresponding decryption key will not be available until the date upon which the payer 10 has authorized the transaction as printed on the check or provided in the electronic debit authorization. In addition, if other information related to the transaction is also encrypted, the payee 14 and/or payee's bank 16 must wait until it can decrypt the information before presenting the check for payment or attempting to debit the account of the payer 10 electronically, as this information will be required by the payer's bank 12 to complete the transaction.

When the maturity date for which the transaction has been authorized arrives, the decryption key that corresponds to the encryption key is made available by the payer's bank 12, or the PKG 22 of the payer's bank 12 (or of a third party). In step 62, the payee 14 or the payee's bank 16 can then obtain the decryption key for that transaction. This can be performed, for example, by the payee 14 or payee's bank 16 directly contacting the payer's bank 12 or PKG 22 and requesting the decryption key for that transaction, or by the payer's bank 12 or PKG 22 publishing the decryption key for each day in some public medium, such as, for example, a website or the like. In the preferred embodiment where the encryption key is formed using the bank identification or routing number and the date specified by the payer 10 on which the transaction is authorized to be completed, the payer's bank 12 need only publish a single decryption key that can decrypt all transactions authorized for that day. Once the payee 14 or the payee's bank 16 has obtained the decryption key that will decrypt the encrypted information, the encrypted information can be decrypted and all necessary information to complete the transaction will then be available to the payee 14 or payee's bank 16. A request for payment can then be presented in step 64 using any conventional clearing process, such as, for example, the clearing house 18. In the case of an electronic authorization, the payee 14 can submit the debit authorization, along with the decrypted authorization number, directly to the payer's bank 14. In step 66, the payer's bank 12, upon receiving the request for payment, including all necessary information to process the payment and the decrypted authorization number, will confirm the accuracy of the decrypted information, e.g., confirm that the information is accurate, i.e., provides a valid account number, name of payer 10, etc., and will verify that the received authorization number is one that was previously generated. Optionally, if the payer 10 has established certain parameters within which a transaction must fall in order for the payer's bank 12 to process a transaction, confirmation that the information is accurate can also include comparing the provided information with each of the parameters established by the payer 10 to confirm the information is within the parameters. Such parameters could include, for example, a maximum amount, an identification of the payee 14, etc. If the transaction as presented for payment does not comply with each of the parameters established by the payer 10, the payer's bank 12 can refuse to complete the transaction. Upon successful confirmation and verification, the payer's bank 12 will then complete the transaction and release the funds from the account of the payer 10. If the information provided is not accurate or the authorization number as received is either not decrypted or is not verified, then the payer's bank 12 will not complete the transaction and funds will not be transferred to the payee's bank 16 or the payee 14.

While the preferred embodiment of the present invention is described using an identity based encryption scheme, it should be noted that any public key encryption system could be used. A third party PKG 22 can generate and publish encryption keys and then release the private decryption keys only after the associated dates. This, however, has the disadvantage of requiring the payer's bank 12 to retrieve a public key from the PKG 22 associated with the maturity date of the transaction. In the preferred IBE based system, the payer's bank 12 can generate the public key and associate it with a future date.

Thus, according to the present invention, methods and systems that prevent completion of postdated financial transactions until the specified future date is provided. While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a financial institution to process a transaction including releasing funds from an account of an account holder to make a payment, the method comprising:

receiving at the financial institution information associated with the transaction from the account holder, the information including a future date on which the transaction is authorized to be completed;

generating at the financial institution a random authorization number for the transaction;

encrypting at the financial institution the authorization number using an encryption key associated with the future date;

providing the encrypted authorization number to the account holder;

on the future date, making a decryption key that corresponds to the encryption key available; and releasing funds from the account of the account holder to complete the transaction only after the authorization number in decrypted form is received at the financial institution from a party requesting the payment.

2. The method of claim 1, wherein encrypting the authorization number further comprises:

encrypting the authorization number using an encryption key formed using at least a portion of the information associated with the transaction.

3. The method of claim 2, wherein the at least a portion of the information associated with the transaction includes the future date.

4. The method of claim 2, wherein the at least a portion of the information associated with the transaction includes information associated with the financial institution.

5. The method of claim 4, wherein the information associated with the financial institution includes a name or routing number of the financial institution.

6. The method of claim 1, wherein encrypting the authorization number further comprises:

encrypting the authorization number and at least a portion of the information associated with the transaction using an encryption key associated with the future date.

7. The method of claim 6, wherein the at least a portion of the information associated with the transaction includes an account number, a name of a payee, and an amount.

8. The method of claim 1, wherein making a corresponding decryption key available further comprises:

publishing the corresponding decryption key in a public medium.

9. The method of claim 1, wherein encrypting the authorization number further comprises:

encrypting the authorization number and a random pad using an encryption key associated with the future date.

* * * * *